US012772248B2

(12) United States Patent
Tang et al.

(10) Patent No.: US 12,772,248 B2
(45) Date of Patent: Oct. 20, 2026

(54) METHOD AND APPARATUS FOR CAPABILITY INDICATION OF REPETITION FOR MESSAGE 4 HYBRID AUTOMATIC REPEAT REQUEST FEEDBACK

(71) Applicant: MediaTek Singapore Pte. Ltd., Singapore (SG)

(72) Inventors: Wen Tang, Beijing (CN); Chun-Chia Chen, Hsinchu City (TW); Gilles Charbit, Cambridge (GB); Abhishek Roy, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 284 days.

(21) Appl. No.: 18/432,178

(22) Filed: Feb. 5, 2024

(65) Prior Publication Data

US 2024/0284461 A1 Aug. 22, 2024

(30) Foreign Application Priority Data

Feb. 16, 2023 (WO) ................ PCT/CN2023/076490
Mar. 27, 2023 (WO) ................ PCT/CN2023/084134
Jan. 23, 2024 (CN) ......................... 202410096738.6

(51) Int. Cl.
*H04W 72/21* (2023.01)
*H04L 1/1812* (2023.01)
(Continued)

(52) U.S. Cl.
CPC ........... *H04W 72/21* (2023.01); *H04L 1/1812* (2013.01); *H04L 5/0012* (2013.01);
(Continued)

(58) Field of Classification Search
CPC ....... H04L 1/08; H04L 1/1812; H04L 1/1858; H04L 1/1896; H04L 5/0012;
(Continued)

(56) References Cited

U.S. PATENT DOCUMENTS 11,503,609 B2 * 11/2022 Yang ................. H04W 72/0446
11,638,306 B2 * 4/2023 Lei .................... H04W 74/0833
370/329

(Continued)

FOREIGN PATENT DOCUMENTS

CA 3119114 A1 * 11/2021 ............ H04W 72/21
CN 114868450 A * 8/2022 ............ H04W 72/21

(Continued)

OTHER PUBLICATIONS

Huawei et al., Discussion on coverage enhancement for NR NTN, Nov. 14, 2022, 3GPP TSG-RAN WG1 Meeting #111, Toulouse, France, Agenda Item: 9.11.1, Tdoc: R1-2210872 (Year: 2022).*

(Continued)

*Primary Examiner* — Eric Nowlin
(74) *Attorney, Agent, or Firm* — Andy M. Han; Han IP PLLC

(57) ABSTRACT

Various solutions for capability indication of repetition for Message 4 (Msg4) hybrid automatic repeat request (HARQ)-acknowledgement (ACK) or Msg4 HARQ-negative ACK (NACK) are described. An apparatus may receive a system information block (SIB) from a network node of a wireless network, wherein the SIB comprises one or more physical uplink control channel (PUCCH) repetition numbers for Msg4. The apparatus may report a capability indication of PUCCH repetition for Msg4 HARQ-ACK or Msg4 HARQ-NACK to the network node through a Message 1 (Msg1) or a Message 3 (Msg3). The apparatus may transmit with repetitions a PUCCH with HARQ-ACK information or HARQ-NACK information for Msg4 to the network node according to one of the one or more PUCCH repetition numbers for Msg4.

16 Claims, 8 Drawing Sheets

(51) Int. Cl.
*H04L 5/00* (2006.01)
*H04W 72/1268* (2023.01)
*H04W 72/232* (2023.01)
*H04W 72/51* (2023.01)

(52) U.S. Cl.
CPC ..... *H04W 72/1268* (2013.01); *H04W 72/232* (2023.01); *H04W 72/51* (2023.01)

(58) Field of Classification Search
CPC ............ H04L 5/0055; H04W 72/1268; H04W 72/21; H04W 72/232; H04W 72/51; H04W 74/0833
See application file for complete search history.

(56) References Cited

U.S. PATENT DOCUMENTS 11,653,389 B2 * 5/2023 Lei .................... H04W 74/0833 370/329
11,723,032 B2 * 8/2023 Yi ......................... H04L 5/0053 370/330
11,991,757 B2 * 5/2024 Taherzadeh Boroujeni ................ H04W 74/0841
12,207,271 B2 * 1/2025 Taherzadeh Boroujeni ................ H04W 74/006
12,284,653 B2 * 4/2025 Fakoorian .............. H04B 1/713
12,317,329 B2 * 5/2025 Li ..................... H04W 74/0833
2019/0182824 A1 * 6/2019 Chatterjee ............. H04L 5/0053
2021/0100004 A1 * 4/2021 Yang ................... H04L 27/2607
2021/0144701 A1 * 5/2021 Ly ......................... H04W 52/38
2021/0195653 A1 * 6/2021 Lei .................... H04W 74/0833
2021/0195654 A1 * 6/2021 Lei .................... H04W 74/0833
2021/0251016 A1 * 8/2021 Xiong ................... H04L 1/0061
2021/0360616 A1 * 11/2021 Yi ......................... H04L 5/0053
2022/0225322 A1 * 7/2022 Shim ................... H04W 56/005
2022/0225363 A1 * 7/2022 Shim ................. H04W 72/1268
2022/0322417 A1 * 10/2022 Taherzadeh Boroujeni ................ H04W 74/006
2022/0417999 A1 * 12/2022 Li ..................... H04W 74/0833
2023/0043094 A1 * 2/2023 Taherzadeh Boroujeni ................ H04W 74/0841
2024/0008092 A1 * 1/2024 Dai ................... H04W 74/0833
2024/0172222 A1 * 5/2024 Tang ...................... H04L 5/0053
2024/0284461 A1 * 8/2024 Tang .......................... H04L 1/08
2024/0323963 A1 * 9/2024 Fakoorian ............. H04L 1/1896
2024/0340960 A1 * 10/2024 Li ......................... H04W 72/51
2025/0007654 A1 * 1/2025 Li ....................... H04W 74/004
2025/0048368 A1 * 2/2025 Leng ..................... H04B 17/328
2025/0088332 A1 * 3/2025 Shim ................... H04W 72/232
2025/0274804 A1 * 8/2025 Lyu ....................... H04L 5/0048
2025/0365732 A1 * 11/2025 Ye ........................... H04L 1/189

FOREIGN PATENT DOCUMENTS

CN 114868451 A * 8/2022 ............ H04W 72/20
CN 117178613 A * 12/2023 ............. H04B 1/713
CN 114868450 B * 6/2024 ........... H04B 17/328
CN 114868451 B * 8/2024 ........ H04W 74/0833
CN 120167107 A * 6/2025 ........ H04W 74/0833
CN 121058188 A * 12/2025 ........... H04L 1/1864
EP 3913845 A2 * 11/2021 ............ H04W 72/21
EP 4383605 A1 * 6/2024 ........... H04L 1/1861
EP 4079082 B1 * 10/2024 ........... H04B 17/328
EP 3913845 B1 * 7/2025 ........... H04L 5/0094
EP 4074116 B1 * 10/2025 ........ H04W 74/0833
EP 4648538 A2 * 11/2025 ........ H04W 74/0833
JP 2025536976 A * 11/2025 ........ H04W 74/0833
KR 20220117877 A * 8/2022 ............ H04W 72/20
KR 20220119022 A * 8/2022 ............ H04W 72/21
KR 102811323 B1 * 5/2025 ........... H04B 17/328
KR 20250079040 A * 6/2025 ........... H04B 17/328
TW 202127945 A * 7/2021 ............ H04W 72/21
TW 202133673 A * 9/2021 ............ H04W 72/20
TW I878416 B * 4/2025 ............ H04W 72/20
TW I856225 B * 9/2025 ........... H04B 17/328
WO WO-2021062209 A1 * 4/2021 ........... H04L 5/0094
WO WO-2021127563 A1 * 6/2021 ............ H04W 72/21
WO WO-2021133638 A1 * 7/2021 ............ H04W 72/20
WO WO-2023014088 A1 * 2/2023 ........... H04L 1/1861
WO WO-2023015092 A1 * 2/2023 ........ H04W 74/0833
WO WO-2023138624 A1 * 7/2023 ........ H04W 74/0833
WO WO-2024092618 A1 * 5/2024 ........ H04W 74/0833
WO WO-2025033875 A1 * 2/2025 ............ H04W 72/21
WO WO-2025102393 A1 * 5/2025 ............ H04W 74/08

OTHER PUBLICATIONS

Vivo, Discussion on coverage enhancement for NR NTN, Nov. 14, 2022, 3GPP TSG-RAN WG1 Meeting #111, Toulouse, France, Agenda Item: 9.11.1, Tdoc: R1-2211026 (Year: 2022).*
MediaTek Inc., Coverage enhancement for NR NTN, Nov. 14, 2022, 3GPP TSG-RAN WG1 Meeting #111, Toulouse, France, Agenda Item: 9.11.1, Tdoc: R1-2211093 (Year: 2022).*
Intel Corporations, On coverage enhancement for NR NTN, Nov. 14, 2022, 3GPP TSG-RAN WG1 Meeting #111, Toulouse, France, Agenda Item: 9.11.1, Tdoc: R1-2211416 (Year: 2022).*
Moderator (NTT Docomo, Inc.), Summary #4 on 9.11.1 Coverage enhancement for NR NTN, Nov. 14, 2022, 3GPP TSG-RAN WG1 Meeting #111, Toulouse, France, Agenda Item: 9.11.1, Tdoc: R1-2212864 (Year: 2022).*
Moderator (NTT Docomo, Inc.), Summary #5 on 9.11.1 Coverage enhancement for NR NTN, Nov. 14, 2022, 3GPP TSG-RAN WG1 Meeting #111, Toulouse, France, Agenda Item: 9.11.1, Tdoc: R1-2212865 (Year: 2022).*

* cited by examiner

200

```
BWP-UplinkCommon ::= SEQUENCE {
        genericParameters BWP,
        rach-ConfigCommon SetupRelease { RACH-ConfigCommon } OPTIONAL, -- Need M
        pusch-ConfigCommon SetupRelease { PUSCH-ConfigCommon } OPTIONAL, -- Need M
        pucch-ConfigCommon SetupRelease { PUCCH-ConfigCommon } OPTIONAL, -- Need M
        ...,
        [[
        rach-ConfigCommonIAB-r16 SetupRelease { RACH-ConfigCommon } OPTIONAL, -- Need M
        useInterlacePUCCH-PUSCH-r16 ENUMERATED {enabled} OPTIONAL, -- Need R
        msgA-ConfigCommon-r16 SetupRelease { MsgA-ConfigCommon-r16 } OPTIONAL -- Cond SpCellOnly2
        ]],
        [[
        enableRA-PrioritizationForSlicing-r17 BOOLEAN OPTIONAL, -- Cond RA-PrioSliceAI
        additionalRACH-ConfigList-r17 SetupRelease { AdditionalRACH-ConfigList-r17 } OPTIONAL, -- Cond SpCellOnly2
        rsrp-ThresholdMsg3-r17 RSRP-Range OPTIONAL, -- Need R
        numberOfMsg3-RepetitionsList-r17 SEQUENCE (SIZE (4)) OF NumberOfMsg3-Repetitions-r17 OPTIONAL, -- Cond Msg3Rep
        mcs-Msg3-Repetitions-r17 SEQUENCE (SIZE (8)) OF INTEGER (0..31) OPTIONAL -- Cond Msg3Rep
        ]]
        numberOfMsg4PUCCH-Repetitions-r18          ENUMERATED { n2, n4, n8 }    OPTIONAL, -- Cond Msg4PUCCHRep
}
```

FIG. 2

300

```
BWP-UplinkCommon ::= SEQUENCE {
        genericParameters BWP,
        rach-ConfigCommon SetupRelease { RACH-ConfigCommon } OPTIONAL, -- Need M
        pusch-ConfigCommon SetupRelease { PUSCH-ConfigCommon } OPTIONAL, -- Need M
        pucch-ConfigCommon SetupRelease { PUCCH-ConfigCommon } OPTIONAL, -- Need M
        ...,
        [[
        rach-ConfigCommonIAB-r16 SetupRelease { RACH-ConfigCommon } OPTIONAL, -- Need M
        useInterlacePUCCH-PUSCH-r16 ENUMERATED {enabled} OPTIONAL, -- Need R
        msgA-ConfigCommon-r16 SetupRelease { MsgA-ConfigCommon-r16 } OPTIONAL -- Cond SpCellOnly2
        ]],
        [[
        enableRA-PrioritizationForSlicing-r17 BOOLEAN OPTIONAL, -- Cond RA-PrioSliceAI
        additionalRACH-ConfigList-r17 SetupRelease { AdditionalRACH-ConfigList-r17 } OPTIONAL, -- Cond SpCellOnly2
        rsrp-ThresholdMsg3-r17 RSRP-Range OPTIONAL, -- Need R
        numberOfMsg3-RepetitionsList-r17 SEQUENCE (SIZE (4)) OF NumberOfMsg3-Repetitions-r17 OPTIONAL, -- Cond Msg3Rep
        mcs-Msg3-Repetitions-r17 SEQUENCE (SIZE (8)) OF INTEGER (0..31) OPTIONAL -- Cond Msg3Rep
        ]]
        numberOfMsg4PUCCH-RepetitionsList-r18  SEQUENCE (SIZE (1,2,3,4)) OF NumberOfMsg4PUCCH-Repetitions-r18
        OPTIONAL, -- Cond Msg4PUCCHRep
}

NumberOfMsg4PUCCH-Repetitions-r18::= ENUMERATED { n1, n2, n4, n8 }
```

FIG. 3

400

```
FeatureCombination-r17 ::= SEQUENCE {
    redCap-r17                  ENUMERATED {true}          OPTIONAL,  -- Need R
    smallData-r17               ENUMERATED {true}          OPTIONAL,  -- Need R
    nsag-r17                    NSAG-List-r17              OPTIONAL,  -- Need R
    msg3-Repetitions-r17        ENUMERATED {true}          OPTIONAL,  -- Need R
    msg4-PUCCHRepeition-r18     ENUMERATED {true}          OPTIONAL,  -- Need R
    spare3                      ENUMERATED {true}          OPTIONAL,  -- Need R
    spare2                      ENUMERATED {true}          OPTIONAL,  -- Need R
    spare1                      ENUMERATED {true}          OPTIONAL   -- Need R
}
```

FIG. 4

800

```
BWP-UplinkCommon ::= SEQUENCE {
        genericParameters BWP,
        rach-ConfigCommon SetupRelease { RACH-ConfigCommon } OPTIONAL, -- Need M
        pusch-ConfigCommon SetupRelease { PUSCH-ConfigCommon } OPTIONAL, -- Need M
        pucch-ConfigCommon SetupRelease { PUCCH-ConfigCommon } OPTIONAL, -- Need M
        ...,
        [[
        rach-ConfigCommonIAB-r16 SetupRelease { RACH-ConfigCommon } OPTIONAL, -- Need M
        useInterlacePUCCH-PUSCH-r16 ENUMERATED {enabled} OPTIONAL, -- Need R
        msgA-ConfigCommon-r16 SetupRelease { MsgA-ConfigCommon-r16 } OPTIONAL -- Cond SpCellOnly2
        ]],
        [[
        enableRA-PrioritizationForSlicing-r17 BOOLEAN OPTIONAL, -- Cond RA-PrioSliceAI
        additionalRACH-ConfigList-r17 SetupRelease { AdditionalRACH-ConfigList-r17 } OPTIONAL, -- Cond SpCellOnly2
        rsrp-ThresholdMsg3-r17 RSRP-Range OPTIONAL, -- Need R
        numberOfMsg3-RepetitionsList-r17 SEQUENCE (SIZE (4)) OF NumberOfMsg3-Repetitions-r17 OPTIONAL, -- Cond Msg3Rep
        mcs-Msg3-Repetitions-r17 SEQUENCE (SIZE (8)) OF INTEGER (0..31) OPTIONAL -- Cond Msg3Rep
        ]]
        Msg4pucch-FH-r18        ENUMERATED { intra-slot, inter-slot}     OPTIONAL, -- Cond Msg4PUCCHRep
}
```

FIG. 8

METHOD AND APPARATUS FOR CAPABILITY INDICATION OF REPETITION FOR MESSAGE 4 HYBRID AUTOMATIC REPEAT REQUEST FEEDBACK

CROSS REFERENCE TO RELATED PATENT APPLICATION(S)

The present disclosure is part of a non-provisional application claiming the priority benefit of PCT Application No. PCT/CN2023/076490, filed 16 Feb. 2023, PCT Application No. PCT/CN2023/084134, filed 27 Mar. 2023, and CN Application No. 202410096738.6, filed 23 Jan. 2024. The contents of aforementioned applications are herein incorporated by reference in their entirety.

TECHNICAL FIELD

The present disclosure is generally related to mobile communications and, more particularly, to capability indication of repetition for message 4 (Msg4) hybrid automatic repeat request (HARQ) feedback (e.g., Msg4 HARQ-acknowledgement (ACK) or Msg4 HARQ-negative ACK (NACK)) with respect to user equipment (UE) and network apparatus in mobile communications.

BACKGROUND

Unless otherwise indicated herein, approaches described in this section are not prior art to the claims listed below and are not admitted as prior art by inclusion in this section.

A public land mobile network (PLMN) is a network established and operated by an administration or recognized operating agency (ROA) for the specific purpose of providing land mobile communication services to the public. PLMN provides communication possibilities for mobile users. One PLMN may include multiple radio access networks (RANs) utilizing different radio access technologies (RATs) for accessing mobile services. RAN is part of a mobile communication system, which implements a radio access technology. Conceptually, RAN resides between a mobile device and provides connection with its core network (CN). Depending on the (3$^{rd}$ Generation Partnership Project (3GPP)) standards, mobile phones and other wireless connected devices are varyingly known as user equipment (UE), terminal equipment (TE), mobile stations (MS), or mobile termination (MT), etc. Examples of different RATs include 2$^{nd}$ generation (2G) Global System for Mobile Communications (GSM), 3$^{rd}$ generation (3G) Universal Mobile Telecommunications System (UMTS), 4$^{th}$ generation (4G) Long Term Evolution (LTE), and 5th generation (5G) New Radio (NR). As compared to PLMN, a non-public network (NPN) is a network for non-public use. An NPN is either a stand-alone NPN (SNPN), i.e., operated by an NPN operator and not relying on network functions provided by a PLMN, or a public network integrated NPN (PNI-NPN), i.e., an NPN deployed with the support of a PLMN.

In mobile communications, when a user equipment (UE) performs a physical uplink shared channel (PUSCH) transmission which is scheduled by a random access response (RAR) uplink (UL) grant, but the UE has not been provided a cell-radio network temporary identifier (C-RNTI), the UE may attempt to detect a downlink control information (DCI) format 1_0 with cyclic redundancy check (CRC) scrambled by a temporary C-RNTI (TC-RNTI). The TC-RNTI may schedule a PDSCH that includes a UE contention resolution identity. In 3GPP until Release 17, Msg4 with the UE contention resolution identity information is not transmitted repetitively. Similarly, the HARQ-ACK information or HARQ-NACK information in a physical uplink control channel (PUCCH) for Msg4 is also not transmitted repetitively. However, in scenarios with large coverage in NR, such as NR NTN, coverage requirements remain a major concern in efficient communications, including Msg4 HARQ-ACK or Msg4 HARQ-NACK transmission.

Accordingly, how to enhance Msg4 HARQ-ACK or Msg4 HARQ-NACK transmission becomes an important issue for newly developed wireless communication systems. Therefore, there is a need to provide proper schemes and designs to solve this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is to propose schemes, concepts, designs, systems, methods and apparatus pertaining to capability indication of repetition for Message 4 (Msg4) hybrid automatic repeat request (HARQ)-acknowledgement (ACK) or Msg4 HARQ-negative ACK (NACK). It is believed that the above-described issue would be avoided or otherwise alleviated by implementing one or more of the proposed schemes described herein.

In one aspect, a method may involve an apparatus receiving a system information block (SIB) from a network node of a wireless network, wherein the SIB may comprise one or more physical uplink control channel (PUCCH) repetition numbers for Msg4. The method may also involve the apparatus reporting a capability indication of PUCCH repetition for Msg4 HARQ-ACK or Msg4 HARQ-NACK to the network node through a Message 1 (Msg1) or a Message 3 (Msg3). The method may further involve the apparatus transmitting with repetitions a PUCCH with HARQ-ACK information or HARQ-NACK information for Msg4 to the network node according to one of the one or more PUCCH repetition numbers for Msg4.

In another aspect, an apparatus may involve a transceiver which, during operation, wirelessly communicates with at least one network node of a wireless network. The apparatus may also involve a processor communicatively coupled to the transceiver such that, during operation, the processor may receive, via the transceiver, an SIB from the network node, wherein the SIB may comprise one or more PUCCH repetition numbers for Msg4. The processor may also report, via the transceiver, a capability indication of PUCCH repetition for Msg4 HARQ-ACK or Msg4 HARQ-NACK to the network node through a Msg1 or a Msg3. The processor may further transmit, via the transceiver, with repetitions a PUCCH with HARQ-ACK information or HARQ-NACK information for Msg4 to the network node according to one of the one or more PUCCH repetition numbers for Msg4.

It is noteworthy that, although description provided herein may be in the context of certain radio access technologies, networks and network topologies such as 5$^{th}$ Generation System (5GS) and 4G EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), E-UTRAN, Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, IoT, Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram depicting an example scenario of the parameter numberOfMsg4PUCCH-Repetitions in the IE BWP-UplinkCommon under schemes in accordance with an implementation of the present disclosure.

FIG. 3 is a diagram depicting an example scenario of the parameter numberOfMsg4PUCCH-RepetitionsList-r18 in the IE BWP-UplinkCommon under schemes in accordance with an implementation of the present disclosure.

FIG. 4 is a diagram depicting an example scenario of a capability indication through Msg1 under the first proposed scheme in accordance with an implementation of the present disclosure.

FIG. 8 is a diagram depicting an example scenario of a frequency hopping indication configured in the system information block (SIB) under the fourth proposed scheme in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to capability indication of repetition for Message 4 (Msg4) hybrid automatic repeat request (HARQ)-acknowledgement (ACK) or Msg4 HARQ-negative ACK (NACK). According to the present disclosure, a number of possible solutions may be implemented separately or jointly. That is, although these possible solutions may be described below separately, two or more of these possible solutions may be implemented in one combination or another.

Figure 1:
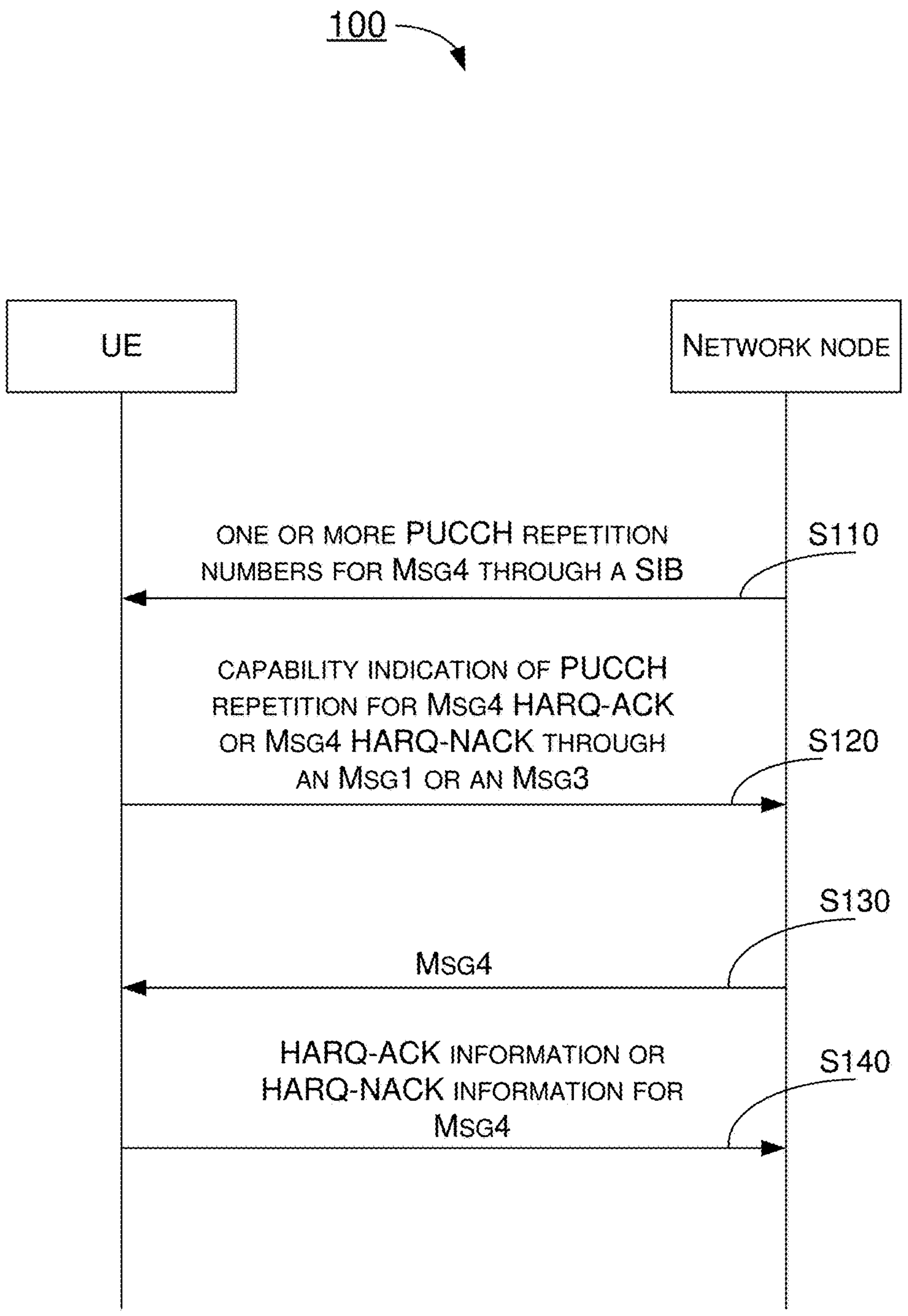
FIG. 1 is a diagram depicting an example scenario of Message 4 (Msg4) hybrid automatic repeat request (HARQ)-acknowledgement (ACK) or Msg4 HARQ-negative ACK (NACK) transmission under schemes in accordance with implementations of the present disclosure.

FIG. 1 illustrates an example scenario 100 for Msg4 HARQ feedback transmission under schemes in accordance with implementations of the present disclosure. The Msg4 HARQ feedback may comprise at least one of a Msg4 HARQ-ACK and a Msg4 HARQ-NACK. Scenario 100 involves a UE and a network node (e.g., a (macro/micro) base station) which may be a part of a wireless communication network (e.g., an LTE network, a 5G/NR network, an IoT network or a 6G network). Referring to FIG. 1, in step S110, the UE may receive a system information block (SIB) from the network node. Specifically, the SIB may comprise one or more physical uplink control channel (PUCCH) repetition numbers for Msg4. In an example, the network node may configure one repetition factor (e.g., {2}, {4}, or {8}) in the SIB to indicate one PUCCH repetition number for Msg4. In another example, the network node may configure more than one repetition factors (e.g., {1, 2, 4, 8}) in a candidate list in the SIB to indicate the PUCCH repetition numbers for Msg4.

In step S120, the UE may report its capability indication of PUCCH repetition for Msg4 HARQ-ACK or Msg4 HARQ-NACK to the network node through a Message 1 (Msg1) or a Message 3 (Msg3). The network node may know whether the UE can support the PUCCH repetition for Msg4 HARQ-ACK or Msg4 HARQ-NACK or not according to the capability indication from the UE.

In step S130, the network node may transmit a Msg4 to the UE. In one example, if multiple PUCCH repetition numbers for Msg4 are configured in the SIB, the Msg4 may include a DCI indicating the UE to select one of the configured multiple PUCCH repetition numbers for Msg4.

In step S140, the UE may transmit with repetitions a PUCCH with HARQ-ACK information or HARQ-NACK information for Msg4 to the network node according to the one or more PUCCH repetition numbers for Msg4. In one example, if only one PUCCH repetition number for Msg4 is configured in the SIB, the UE may perform the Msg4 HARQ-ACK or Msg4 HARQ-NACK transmission repetitively using the single PUCCH repetition number for Msg4. In another example, if multiple PUCCH repetition numbers for Msg4 are configured in the SIB, the UE may perform the Msg4 HARQ-ACK or Msg4 HARQ-NACK transmission repetitively using the selected one of the multiple PUCCH repetition numbers for Msg4 based on the DCI in the received Msg4.

In some implementations, the SIB in step S110 may include a SIB type 1 (SIB1) containing an information element (IE) bandwidth part (BWP)-UplinkCommon to configure the one or more PUCCH repetition numbers for Msg4. For example, if only one PUCCH repetition number for Msg4 is to be configured in SIB1, the IE BWP-UplinkCommon may include a radio resource control (RRC) parameter (e.g., numberOfMsg4PUCCH-Repetitions-r18) to indicate the single PUCCH repetition number for Msg4. FIG. 2 illustrates an example scenario 200 of the parameter numberOfMsg4PUCCH-Repetitions in the IE BWP-UplinkCommon in accordance with an implementation of the present disclosure. Specifically, the parameter numberOfMsg4PUCCH-Repetitions indicates the number of repetitions for Msg4 PUCCH. Alternatively, if multiple PUCCH repetition numbers for Msg4 are to be configured in SIB1, the IE BWP-UplinkCommon may include an RRC parameter (e.g., numberOfMsg4PUCCH-RepetitionsList-r18) to indicate the multiple PUCCH repetition numbers for Msg4. FIG. 3 illustrates an example scenario 300 of the parameter numberOfMsg4PUCCH-RepetitionsList-r18 in the IE BWP-UplinkCommon in accordance with an implementation of the present disclosure. Specifically, the parameter numberOfMsg4PUCCH-RepetitionsList-r18 indicates the number of repetitions for Msg4 HARQ ACK/NACK scheduled by DCI format 1_0 with cyclic redundancy check (CRC) scrambled by a corresponding temporary cell-radio network temporary identifier (TC-RNTI). The parameter numberOfMsg4PUCCH-RepetitionsList-r18 may be only applicable when the UE indicates the Msg4 PUCCH repetition in the BWP. If the parameter numberOfMsg4PUCCH-RepetitionsList-r18 is absent, the UE may apply single Msg4 PUCCH transmission without repetitions. If the sequence size of the parameter numberOfMsg4PUCCH-RepetitionsList-r18 is 1, the candidate values are {n2, n4, n8}. In addition, the parameter NumberOfMsg4PUCCH-Repetitions-r18 indicates the number of repetitions for Msg4 PUCCH.

In some implementations, the UE may determine the PUCCH repetition number for Msg4 based on a DCI from the network node in an event that more than one PUCCH repetition numbers are configured in the SIB. Specifically, the network node may transmit a DCI to the UE to dynamically indicate which one of the configured multiple PUCCH repetition numbers to be used. The DCI may include a DCI format 1_0 with CRC scrambled by a TC-RNTI. In some implementations, the UE may determine the PUCCH repetition number for Msg4 based on the SIB in an event that only one PUCCH repetition number is configured in the SIB.

For example, the UE may be indicated to transmit the Msg4 PUCCH with $$N_{PUCCHforMSG4}^{repeat}$$

repetitions in an event that the UE indicates that it capable of supporting the Msg4 PUCCH repetition. In an example, in an event that more than one repetition factors for Msg4 PUCCH are configured in the BWP-UplinkCommon and the repetition factors for Msg4 PUCCH are dynamically indicated in the DCI format 1_0 with CRC scrambled by a corresponding TC-RNTI with the PUCCH repetition factor for the Msg4 field, the PUCCH repetition number $$N_{PUCCHforMSG4}^{repeat}$$

may be provided according to the PUCCH repetition factor for Msg4 field in the DCI and the repetition factors for Msg4 PUCCH configured in the BWP-UplinkCommon. In another example, in an event that one repetition factor for Msg4 PUCCH are configured in BWP-UplinkCommon and the repetition factors for Msg4 PUCCH is dynamically indicated in the DCI format 1_0 with CRC scrambled by a corresponding TC-RNTI with the PUCCH repetition factor for the Msg4 field, the PUCCH repetition number $$N_{PUCCHforMSG4}^{repeat}$$

may be provided according to the PUCCH repetition factor for Msg4 field in the DCI. In another example, in an event that only one repetition factor for Msg4 PUCCH are configured in the BWP-UplinkCommon and no PUCCH repetition factor is dynamically indicated in the DCI format 1_0 with CRC scrambled by a corresponding TC-RNTI with the PUCCH repetition factor for the Msg4 field, the PUCCH repetition number $$N_{PUCCHforMSG4}^{repeat}$$

may be provided by one repetition factor for Msg4 PUCCH configured in the BWP-UplinkCommon. Otherwise, the PUCCH repetition number $$N_{PUCCHforMSG4}^{repeat}$$

is 1.

Under a first proposed scheme in accordance with the present disclosure, the capability indication of PUCCH repetition for Msg4 HARQ-ACK or Msg4 HARQ-NACK may be reported via a Msg1. In an implementation of the first proposed scheme, the capability indication of PUCCH repetition for Msg4 HARQ-ACK or Msg4 HARQ-NACK is reported by reporting another capability indication of physical uplink shared channel (PUSCH) repetition for Msg3 through the Msg1. That is, the same capability indication for Msg3 PUSCH repetition may be used for the Msg4 PUCCH repetition. In other words, if the UE indicates that it supports the Msg3 PUSCH repetition, it may imply that the UE also supports the Msg4 PUCCH repetition. The following examples and implementations under the first proposed scheme are illustrated through Msg4 HARQ-ACK, but the present disclosure should not be limited thereto. These examples and implementations under the first proposed scheme also can be applied for Msg4 HARQ-NACK.

For example, the UE may receive the reference symbol received power (RSRP) thresholds for Msg3 and Msg4 HARQ-ACK (e.g., rsrp-ThresholdMsg3 and rsrp-ThresholdMsg4HARQ-ACK) which are configured by the network node through the SIB. In an example, if the BWP selected for random access procedure is configured with the set(s) of random access resources with the Msg3 repetition and the Msg4 HARQ-ACK repetition indication and with other set(s) of random access resources without the Msg3 repetition and the Msg4 HARQ-ACK repetition indication, and the RSRP of the downlink path loss reference is less than rsrp-ThresholdMsg3 and rsrp-ThresholdMsg4HARQ-ACK, it may be assumed that the Msg3 repetition and the Msg4 HARQ-ACK repetition can be applicable for the current random access procedure. In another example, if the BWP selected for random access procedure is only configured with the set(s) of random access resources with the Msg3 repetition and the Msg4 HARQ-ACK repetition indication, it may be assumed that the Msg3 repetition and the Msg4 HARQ-ACK repetition can be applicable for the current random access procedure. Otherwise, it may be assumed that the Msg3 repetition cannot be applicable for the current random access procedure, i.e., the Msg4 HARQ-ACK repetition indication also cannot be applicable for the current random access procedure.

In another implementation of the first proposed scheme, the UE may report both the capability indication of PUCCH repetition for Msg4 HARQ-ACK and another capability indication of PUSCH repetition for Msg3 through the Msg1 or the Msg3. For example, the capability indication of PUCCH repetition for Msg4 HARQ-ACK and another capability indication of PUSCH repetition for Msg3 may be both indicated in a parameter (e.g., FeatureCombination) in Msg1.

FIG. 4 illustrates an example scenario 400 of a capability indication through Msg1 under the first proposed scheme in accordance with an implementation of the present disclosure. As shown in FIG. 4, both of the capability indication of PUCCH repetition for Msg4 HARQ-ACK and another capability indication of PUSCH repetition for Msg3 are configured in FeatureCombination, i.e., msg3-Repetitions-r17 and msg4-PUCCHRepeition-r18.

Under a second proposed scheme in accordance with the present disclosure, the capability indication of PUCCH repetition for Msg4 HARQ-ACK or Msg4 HARQ-NACK may be reported via a Msg3. In accordance with implementations of the second proposed scheme, at least one reserved bit (R bit) of a medium access control (MAC) subheader of the Msg3 may be used to indicate the capability indication of PUCCH repetition for Msg4 HARQ-ACK or Msg4 HARQ-NACK. There are 2 reserved bits in the MAC subheader of the Msg3, and at least one of these 2 reserved bits can be used to indicate the capability indication of PUCCH repetition for Msg4 HARQ-ACK or Msg4 HARQ-NACK. The following examples and implementations under the second proposed scheme are illustrated through Msg4 HARQ-ACK, but the present disclosure should not be limited thereto. These examples and implementations under the second proposed scheme also can be applied for Msg4 HARQ-NACK.

Figure 5:
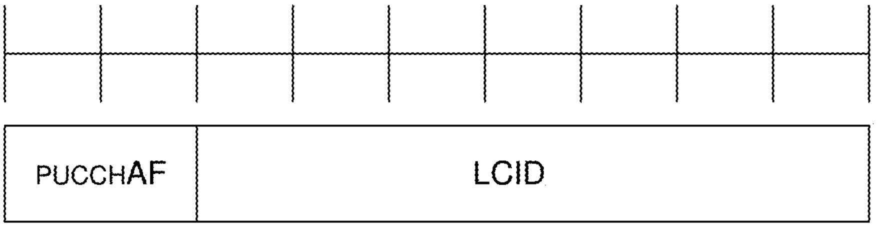
FIG. 5 is a schematic diagram of an example scenario of a medium access control (MAC) subheader of the Message 3 (Msg3) under the second proposed scheme in accordance with implementations of the present disclosure.

FIG. 5 illustrates an example scenario of an MAC subheader of the Msg3 under the second scheme in accordance with implementations of the present disclosure. As shown in FIG. 5, 2 reserved bits in the MAC subheader of the Msg3 may be repurposed as a parameter pucch-AggregationFactor (pucchAF) to indicate the capability indication of PUCCH repetition for Msg4 HARQ-ACK. Table 1 illustrates an example scenario of the parameter pucch-AggregationFactor. As shown in Table 1, the parameter pucch-AggregationFactor may indicate the number of PUCCH repetitions which the UE requests for the Msg4 HARQ-ACK. The size of the parameter pucch-AggregationFactor may be 2 bits. The parameter pucch-AggregationFactor may use 2 reserved bits in MAC subheader of Msg3. If the value of the parameter pucch-AggregationFactor is "00", the number of PUCCH repetitions which the UE requests for the Msg4 HARQ-ACK may be 1. If the value of the parameter pucch-AggregationFactor is "01", the number of PUCCH repetitions which the UE requests for the Msg4 HARQ-ACK may be 2. If the value of the parameter pucch-AggregationFactor is "10", the number of PUCCH repetitions which the UE requests for the Msg4 HARQ-ACK may be 4. If the value of the parameter pucch-AggregationFactor is "11", the number of PUCCH repetitions which the UE requests for the Msg4 HARQ-ACK may be 8.

TABLE 1

| pucchAF | Number of PUCCH repetitions for Msg4 |
|---|---|
| 00 | 1 |
| 01 | 2 |
| 10 | 4 |
| 11 | 8 |

Figure 6:
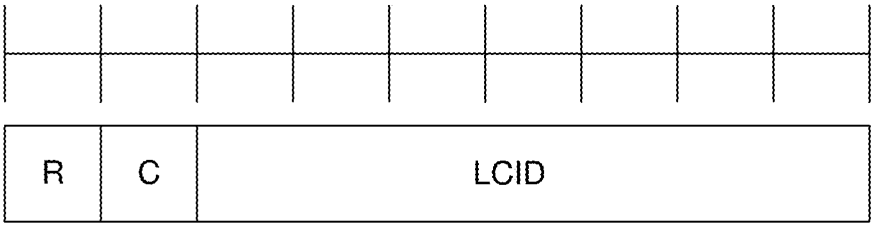
FIG. 6 is a schematic diagram of another example scenario of an MAC subheader of the Msg3 under the second proposed scheme in accordance with implementations of the present disclosure.

FIG. 6 illustrates another example scenario of an MAC subheader of the Msg3 under the second scheme in accordance with implementations of the present disclosure. As shown in FIG. 6, 1 reserved bit in the MAC subheader of the Msg3 may be repurposed as a parameter pucch-AggregationCapability (C) to indicate the capability indication of PUCCH repetition for Msg4 HARQ-ACK. Another reserved bit (e.g., first R bit in the MAC subheader) in the MAC subheader of the Msg3 may be used for the logical channel identifier (LCID) extension in the MAC subheader of the Msg3. If the parameter pucch-AggregationCapability is set to true (e.g., C=1), it may mean that the UE has capability to perform PUCCH repetition for Msg4 HARQ-ACK. If the parameter pucch-AggregationCapability is set to false (e.g., C=0), it may mean that the UE does not have capability to perform PUCCH repetition for Msg4 HARQ-ACK.

Figure 7:
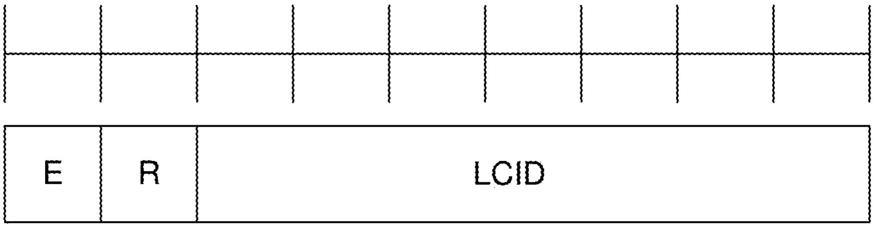
FIG. 7 is a schematic diagram of another example scenario of an MAC subheader of the Msg3 under the second proposed scheme in accordance with implementations of the present disclosure.

FIG. 7 illustrates another example scenario of an MAC subheader of the Msg3 under the second scheme in accordance with implementations of the present disclosure. As shown in FIG. 7, a logical channel identifier (LCID) of the MAC subheader of the Msg3 may be further used to indicate the capability indication of PUCCH repetition for Msg4 HARQ-ACK. Specifically, a parameter or field (e.g., E or LX) of an extension indication for Msg4 HARQ-ACK repetition capability in the MAC subheader of the Msg3 may be used to indicate whether the UE reports capability for Msg4 HARQ-ACK repetition. If the parameter of the extension indication is set to true (e.g., E=1), it may mean that the UE indicates to have capability of PUCCH repetition for Msg4 HARQ-ACK with one state of the LCID. The state may only exist when the parameter is set to true (e.g., E=1). If the parameter of the extension indication is set to false (e.g., E=0), it may mean that the UE does not use the LCID to indicate Msg4 HARQ-ACK repetition capability. The size of the parameter of the extension indication may be 1 bit. The parameter of the extension indication may use 1 reserved bit (e.g., first R bit) in the MAC subheader of Msg3.

Under a third proposed scheme in accordance with the present disclosure, if the UE reports its capability indication of PUCCH repetition for Msg4 HARQ-ACK or Msg4 HARQ-NACK via a Msg1, the PUCCH repetition number for Msg4 may be determined based on a configuration of a PUSCH repetition number for Msg3. The following examples and implementations under the third proposed scheme are illustrated through Msg4 HARQ-ACK, but the present disclosure should not be limited thereto. These examples and implementations under the third proposed scheme also can be applied for Msg4 HARQ-NACK.

In an implementation of the third proposed scheme, a fixed mapping table may be pre-defined for the PUCCH repetition number for Msg4 and the PUSCH repetition number for Msg3. Table 2 illustrates an example scenario of a fixed mapping table. As shown in Table 2, the parameter $R_{HarqAckMsg4}$ may indicate the repetition factor of the PUCCH repetition number for Msg4 and the parameter $R_{Msg3}$ may indicate the repetition factor of the PUSCH repetition number Msg3. The candidate values of the parameter $R_{Msg3}$ may be {n1, n2, n3, n4, n7, n8, n12, n16}, and the number of repetitions for PUSCH transmission may be scheduled by random access response (RAR) UL grant and DCI format 0_0 with CRC scrambled by TC-RNTI.

TABLE 2

| $R_{HarqAckMsg4}$ | $R_{Msg3}$ |
|---|---|
| 1 | $R_{Msg3} <= 2$ |
| 2 | $2 < R_{Msg3} <= 4$ |
| 4 | $4 < R_{Msg3} <= 8$ |
| 8 | $8 < R_{Msg3}$ |

Table 3 illustrates another example scenario of a fixed mapping table. As shown in Table 3, the parameter $R_{HarqAckMsg4}$ may indicate the repetition factor of the PUCCH repetition number for Msg4 and the parameter $R_{Msg3}$ may indicate the repetition factor of the PUSCH repetition number Msg3.

TABLE 3

| $R_{HarqAckMsg4}$ | $R_{Msg3}$ |
|---|---|
| 1 | 1 |
| 2 | $1 < R_{Msg3} <= 2$ |
| 4 | $2 < R_{Msg3} <= 4$ |
| 8 | $4 < R_{Msg3}$ |

In another implementation of the third proposed scheme, a configurable mapping table may be pre-defined for the PUCCH repetition number for Msg4 and the PUSCH repetition number for Msg3. In the configurable mapping table, the lower bounds and the upper bounds may be configurable, e.g., by the parameters in the SIB or in the RRC release message. Table 4 illustrates an example scenario of a configurable mapping table. As shown in Table 4, the parameter $R_{HarqAckMsg4}$ may indicate the repetition factor of the PUCCH repetition number for Msg4 and the parameter $R_{Msg3}$ may indicate the repetition factor of the PUSCH repetition number Msg3. As shown in Table 4, when i=4 and p=8, if $R_{Msg3}=1$, $R_{HarqAckMsg4}=1$; if $R_{Msg3}=4$, $R_{HarqAckMsg4}=2$; if $R_{Msg3}=8$, $R_{HarqAckMsg4}=4$, and if $R_{Msg3}=16$, $R_{HarqAckMsg4}=8$.

TABLE 4

| $R_{HarqAckMsg4}$ | $R_{Msg3}$ |
|---|---|
| 1 | 1 |
| 2 | $1 < R_{Msg3} <= i$ |
| 4 | $i < R_{Msg3} <= p$ |
| 8 | $p < R_{Msg3}$ |

Table 5 illustrates another example scenario of a configurable mapping table. As shown in Table 5, the parameter $R_{HarqAckMsg4}$ may indicate the repetition factor of the PUCCH repetition number for Msg4 and the parameter $R_{Msg3}$ may indicate the repetition factor of the PUSCH repetition number Msg3. As shown in Table 5, when $B_1=1$, $B_2=2$, and $B_3=4$, if $R_{Msg3}=1$, $R_{HarqAckMsg4}=1$; if $R_{Msg3}=2$, $R_{HarqAckMsg4}=2$; if $R_{Msg3}=4$, $R_{HarqAckMsg4}=4$; and if $R_{Msg3}=16$, $R_{HarqAckMsg4}=8$.

TABLE 5

| $R_{HarqAckMsg4}$ | $R_{Msg3}$ |
|---|---|
| 1 | $R_{Msg3} <= B_1$ |
| 2 | $B_1 < R_{Msg3} <= B_2$ |
| 4 | $B_2 < R_{Msg3} <= B_3$ |
| 8 | $B_3 < R_{Msg3}$ |

In another implementation of the third proposed scheme, an equation may be pre-defined for the PUCCH repetition number for Msg4 and the PUSCH repetition number for Msg3. In an example, the equation may be pre-defined by:

$$R_{HarqAckMsg4}=2^{[R_{Msg3}/k]-1},$$

where the parameter $R_{HarqAckMsg4}$ may indicate the repetition factor of the PUCCH repetition number for Msg4, the parameter $R_{Msg3}$ may indicate the repetition factor of the PUSCH repetition number Msg3, and k may be a pre-defined value. The parameter k may be configured in the SIB or in the RRC release message. For example, when k=4 and $R_{Msg3}=4$, $R_{HarqAckMsg4}=2^{[4/4]-1=1}$, when k=4 and $R_{Msg3}=8$, $R_{HarqAckMsg4}=2^{[8/4]-1}=2$; when k=4 and $R_{Msg3}=12$, $R_{HarqAckMsg4}=2^{[12/4]-1}=4$; and when k=4 and $R_{Msg3}=16$, $R_{HarqAckMsg4}=2^{[16/4]-1}=8$.

Under a fourth proposed scheme in accordance with the present disclosure, the UE may receive a frequency hopping indication which is configured in an SIB or a DCI from the network node. The frequency hopping indication may indicate that an intra-slot frequency hopping or an inter-slot frequency hopping is used for each repetition of the PUCCH transmission with HARQ-ACK information or HARQ-NACK information for Msg4. The following examples and implementations under the fourth proposed scheme are illustrated through Msg4 HARQ-ACK, but the present disclosure should not be limited thereto. These examples and implementations under the fourth proposed scheme also can be applied for Msg4 HARQ-NACK.

For example, an RRC parameter (e.g., Msg4pucch-FH-r18) in the IE BWP-UplinkCommon of the SIB may be used to indicate the frequency hopping indication. Alternatively, the UE may determine that the intra-slot frequency hopping is used for each repetition of the PUCCH transmission with HARQ-ACK information for Msg4 in an event that the frequency hopping indication is not configured in the SIB.

FIG. 8 illustrates an example scenario 800 of a frequency hopping indication configured in the SIB under the fourth proposed scheme in accordance with an implementation of the present disclosure. As shown in FIG. 8, an RRC parameter Msg4pucch-FH-r18 in the BWP-UplinkCommon may be used to indicate the frequency hopping indication. In one example, in an event that the RRC parameter Msg4pucch-FH-r18 is set to “intra-slot”, the intra-slot PUCCH frequency hopping may be enabled for each repetition of the PUCCH transmission with HARQ-ACK information for Msg4. In another example, in an event that the RRC parameter Msg4pucch-FH-r18 is set to “inter-slot” and the number of PUCCH repetitions for Msg4 is above 1, the inter-slot PUCCH frequency hopping may be enabled for each repetition of the PUCCH transmission with HARQ-ACK information for Msg4. In another example, in an event that the RRC parameter Msg4pucch-FH-r18 is absent (or not configured), or in an event that the number of PUCCH repetitions for Msg4 is 1, the intra-slot frequency hopping may be used for the PUCCH transmission with HARQ-ACK information for Msg4.

In some implementations, a field of the DCI may be used to indicate the frequency hopping indication. In one example, the field may be a new field (e.g., Msg4pucch-FH indicator) in the DCI format 1_0 with CRC scrambled by a corresponding TC-RNTI. The new field may comprise 1 bit, and if the value of the bit is 1, it may indicate that the inter-slot PUCCH frequency hopping is used for each repetition of the PUCCH transmission with HARQ-ACK information for Msg4. Otherwise, if the value of the bit is 0, it may indicate that the intra-slot PUCCH frequency hopping is used for each repetition of the PUCCH transmission with HARQ-ACK information for Msg4. In another example, the field may reuse an existing field (e.g., the downlink assignment index (DAI) field) in the DCI format 1_0 with CRC scrambled by a corresponding TC-RNTI.

Table 6 illustrates an example scenario of a reused field in the DCI. As shown in Table 6, if the value of the DAI field is "00" or "01", it may indicate that the intra-slot PUCCH frequency hopping is used for each repetition of the PUCCH transmission with HARQ-ACK information for Msg4. If the value of the DAI field is "10" or "11", it may indicate that the inter-slot PUCCH frequency hopping may be used for each repetition of the PUCCH transmission with HARQ-ACK information for Msg4.

TABLE 6

| Downlink assignment index | frequency hopping for Msg4 PUCCH |
|---|---|
| 00 | Intra-slot frequency hopping for Msg4 |
| 01 | PUCCH |
| 10 | Inter-slot frequency hopping for Msg4 |
| 11 | PUCCH |

Table 7 illustrates another example scenario of a reused field in the DCI. As shown in Table 7, if the value of the DAI field is "00" or "01", it may indicate that the inter-slot PUCCH frequency hopping is used for each repetition of the PUCCH transmission with HARQ-ACK information for Msg4. If the value of the DAI field is "10" or "11", it may indicate that the intra-slot PUCCH frequency hopping is used for each repetition of the PUCCH transmission with HARQ-ACK information for Msg4.

TABLE 7

| Downlink assignment index | frequency hopping for Msg4 PUCCH |
|---|---|
| 00 | Inter-slot frequency hopping for Msg4 |
| 01 | PUCCH |
| 10 | Intra-slot frequency hopping for Msg4 |
| 11 | PUCCH |

Under a fifth proposed scheme in accordance with the present disclosure, the UE may receive an updated SIB with updated PUCCH repetition number(s) for Msg4 in a radio resource control (RRC) connected mode. In an implementation of the fifth proposed scheme, one single updated PUCCH repetition number for Msg4 may be indicated in the updated SIB in the RRC connected mode. In an example, the UE may determine a current PUCCH repetition number for Msg4 based on the previous PUCCH repetition number for Msg4 with the DCI scrambled by the TC-RNTI. Then, the UE may use the previous PUCCH repetition number for the following PUCCH with the common PUCCH resource. In another example, the UE may determine a current PUCCH repetition number for Msg4 based on the single updated PUCCH repetition number for Msg4 indicated in the updated SIB. Then, the UE may use the single updated PUCCH repetition number for the following PUCCH with the common PUCCH resource after the end of the system information (SI) window or after a pre-defined or configured reference point.

In another implementation of the fifth proposed scheme, more than one updated PUCCH repetition numbers for Msg4 may be indicated in the updated SIB in the RRC connected mode. In an example, the UE may determine a current PUCCH repetition number for Msg4 based on the previous PUCCH repetition number for Msg4 with the DCI scrambled by the TC-RNTI. Then, the UE may use the previous PUCCH repetition number for the following PUCCH with the common PUCCH resource. In another example, the UE may determine a current PUCCH repetition number for Msg4 based on one of the updated PUCCH repetition numbers for Msg4, wherein the one of the updated PUCCH repetition numbers for Msg4 may be indicated by a configuration in an updated DCI, an RRC message, or a MAC control element (CE), e.g., the smallest updated PUCCH repetition number, the largest updated PUCCH repetition number, or one pre-defined or configured updated PUCCH repetition number. Then, the UE may use the one of the updated PUCCH repetition numbers for the following PUCCH with the common PUCCH resource after the end of the SI window or after a pre-defined or configured reference point. In yet another example, the UE may determine a current PUCCH repetition number for Msg4 based on the one of the updated PUCCH repetition numbers for Msg4. The one of the updated PUCCH repetition numbers for Msg4 may be indicated by a previous DCI associated with indicating the one PUCCH repetition number for Msg4. That is, the UE may use the previous DCI associated with indicating the one PUCCH repetition number for Msg4 to dynamically select one updated PUCCH repetition number from the updated PUCCH repetition numbers for Msg4 indicated in the updated SIB. Then, the UE may use the updated PUCCH repetition number for the following PUCCH with the common PUCCH resource after the end of the SI window or after a pre-defined or configured reference point.

The present disclosure may propose the schemes for how to indicate the PUCCH repetition number information and the capability indication for Msg4 HARQ-ACK or Msg4 HARQ-NACK in NR with large coverage requirements scenarios.

Illustrative Implementations

Figure 9:
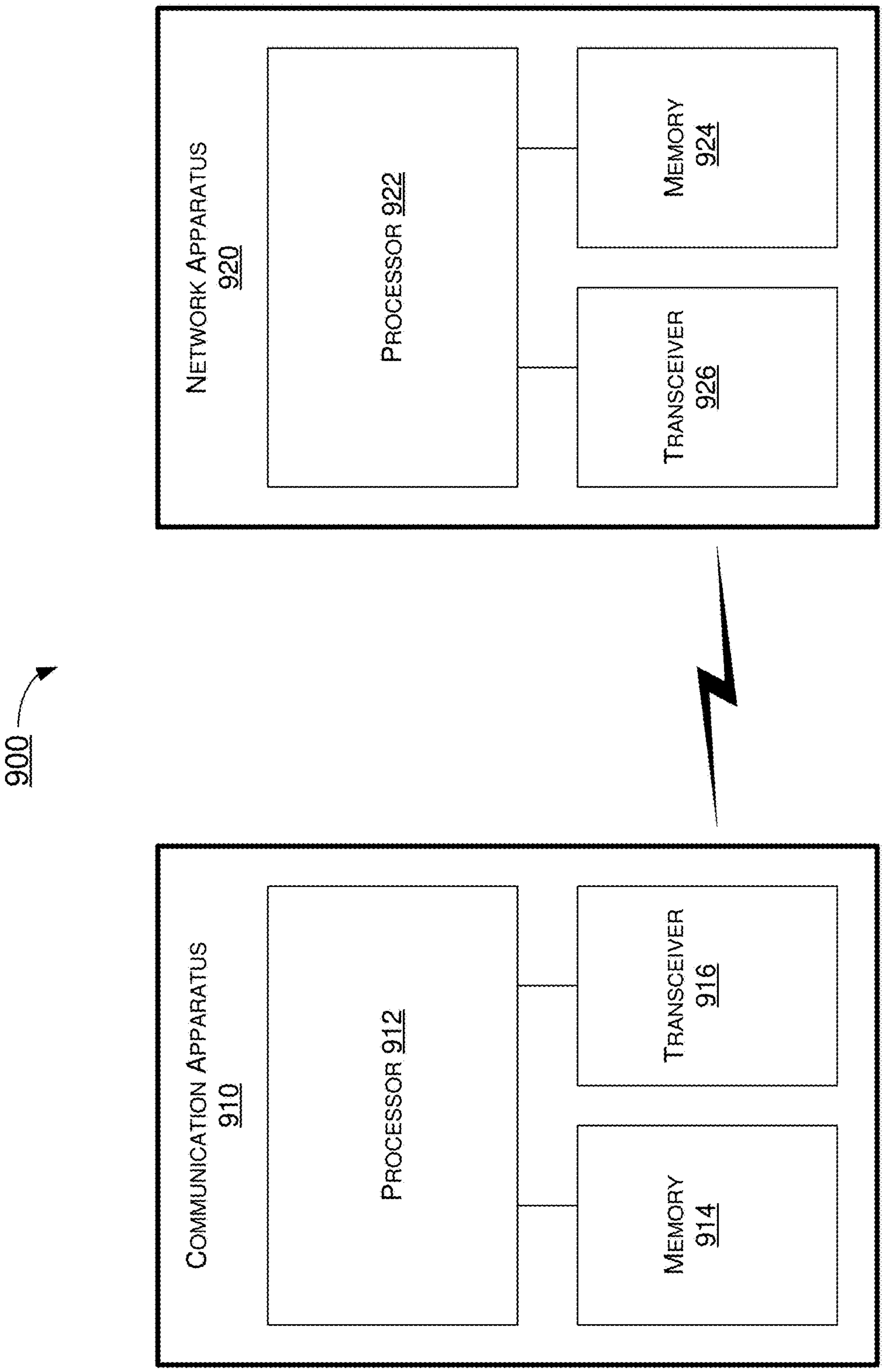
FIG. 9 is a block diagram of an example communication system in accordance with an implementation of the present disclosure.

FIG. 9 illustrates an example communication system 900 having at least an example communication apparatus 910 and an example network apparatus 920 in accordance with an implementation of the present disclosure. Each of communication apparatus 910 and network apparatus 920 may perform various functions to implement schemes, techniques, processes and methods described herein pertaining to capability indication of repetition for Msg4 HARQ-ACK or Msg4 HARQ-NACK in mobile communications, including the various schemes described above with respect to various proposed designs, concepts, schemes and methods described above and with respect to user equipment and network apparatus in mobile communications, including scenarios/schemes described above as well as process 1000 described below.

Communication apparatus 910 may be a part of an electronic apparatus, which may be a UE such as a portable or mobile apparatus, a wearable apparatus, a wireless communication apparatus or a computing apparatus. For instance, communication apparatus 910 may be implemented in a smartphone, a smartwatch, a personal digital assistant, a digital camera, or a computing equipment such as a tablet computer, a laptop computer or a notebook computer. Communication apparatus 910 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 910 may be implemented in a smart thermostat, a smart fridge, a smart door lock, a wireless speaker or a home control center. Alternatively, communication apparatus 910 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 910 may include at least some of those components shown in FIG. 9 such as a processor 912, for example. Communication apparatus 910 may further include one or more other components not pertinent to the proposed scheme of the present disclosure (e.g., internal power supply, display device and/or user interface device), and, thus, such component(s) of communication apparatus 910 are neither shown in FIG. 9 nor described below in the interest of simplicity and brevity.

Network apparatus 920 may be a part of a network apparatus, which may be a network node such as a satellite, a base station, a small cell, a router or a gateway. For instance, network apparatus 920 may be implemented in an eNodeB in an LTE network, in a gNB in a 5G/NR, IoT, NB-IoT or IIoT network or in a satellite or base station in a 6G network. Alternatively, network apparatus 920 may be implemented in the form of one or more IC chips such as, for example and without limitation, one or more single-core processors, one or more multi-core processors, or one or more RISC or CISC processors. Network apparatus 920 may include at least some of those components shown in FIG. 9 such as a processor 922, for example. Network apparatus 920 may further include one or more other components not pertinent to the proposed scheme of the present disclosure (e.g., internal power supply, display device and/or user interface device), and, thus, such component(s) of network apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including autonomous reliability enhancements in a device (e.g., as represented by communication apparatus 910) and a network (e.g., as represented by network apparatus 920) in accordance with various implementations of the present disclosure.

In some implementations, communication apparatus 910 may also include a transceiver 916 coupled to processor 912 and capable of wirelessly transmitting and receiving data. In some implementations, communication apparatus 910 may further include a memory 914 coupled to processor 912 and capable of being accessed by processor 912 and storing data therein. In some implementations, network apparatus 920 may also include a transceiver 926 coupled to processor 922 and capable of wirelessly transmitting and receiving data. In some implementations, network apparatus 920 may further include a memory 924 coupled to processor 922 and capable of being accessed by processor 922 and storing data therein. Accordingly, communication apparatus 910 and network apparatus 920 may wirelessly communicate with each other via transceiver 916 and transceiver 926, respectively. To aid better understanding, the following description of the operations, functionalities and capabilities of each of communication apparatus 910 and network apparatus 920 is provided in the context of a mobile communication environment in which communication apparatus 910 is implemented in or as a communication apparatus or a UE and network apparatus 920 is implemented in or as a network node of a communication network.

In some implementations, processor 912 may receive, via transceiver 916, an SIB from network apparatus 920 of a wireless network, wherein the SIB may comprise one or more PUCCH repetition numbers for Msg4. Processor 912 may report a capability indication of PUCCH repetition for Msg4 HARQ-ACK or Msg4 HARQ-NACK to network apparatus 920 through a Msg1 or a Msg3. Processor 912 may transmit, via transceiver 916, with repetitions a PUCCH with HARQ-ACK information or HARQ-NACK information for Msg4 to the network node according to one of the one or more PUCCH repetition numbers for Msg4.

In some implementations, processor 912 may report the capability indication of PUCCH repetition for Msg4 HARQ-ACK or Msg4 HARQ-NACK by reporting another capability indication of PUSCH repetition for Msg3 through the Msg1.

In some implementations, processor 912 may report, via transceiver 916, the capability indication of PUCCH repetition for Msg4 HARQ-ACK or Msg4 HARQ-NACK and another capability indication of PUSCH repetition for Msg3.

In some implementations, in an event that the capability indication of PUCCH repetition for Msg4 HARQ-ACK or Msg4 HARQ-NACK is reported through the Msg3, at least one reserved bit of an MAC subheader of the Msg3 may be used to indicate the capability indication of PUCCH repetition for Msg4 HARQ-ACK or Msg4 HARQ-NACK.

In some implementations, an LCID of the MAC subheader of the Msg3 may be further used to indicate the capability indication of PUCCH repetition for Msg4 HARQ-ACK or Msg4 HARQ-NACK.

In some implementations, the one PUCCH repetition number for Msg4 may be determined based on a configuration of a PUSCH repetition number for Msg3.

In some implementations, processor 912 may determine the one PUCCH repetition number for Msg4 based on a DCI in an event that more than one PUCCH repetition numbers are configured in the SIB, or determine the one PUCCH repetition number for Msg4 based on the SIB in an event that only one PUCCH repetition number is configured in the SIB.

In some implementations, processor 912 may receive, via transceiver 916, a frequency hopping indication which is configured in the SIB or a DCI from network apparatus 920. The frequency hopping indication may indicate that an intra-slot frequency hopping or an inter-slot frequency hopping is used for each repetition of the PUCCH transmission with HARQ-ACK information or HARQ-NACK information for Msg4. In some implementations, processor 912 may determine that the intra-slot frequency hopping is used for each repetition of the PUCCH transmission with HARQ-ACK information or HARQ-NACK information for Msg4 in an event that the frequency hopping indication is not configured in the SIB.

In some implementations, processor 912 may receive, via transceiver 916, an updated SIB in an RRC connected mode, wherein a single updated PUCCH repetition number for Msg4 may be indicated in the updated SIB. Processor 912 may determine a current PUCCH repetition number for Msg4 based on the one PUCCH repetition number for Msg4 or the updated PUCCH repetition number for Msg4.

In some implementations, processor 912 may receive, via transceiver 916, an updated SIB in an RRC connected mode, wherein more than one updated PUCCH repetition numbers for Msg4 may be indicated in the updated SIB. Processor 912 may determine a current PUCCH repetition number for Msg4 based on the one PUCCH repetition number for Msg4 or one of the updated PUCCH repetition numbers for Msg4, wherein the one updated PUCCH repetition number for Msg4 is indicated by a previous DCI associated with indicating the one PUCCH repetition number for Msg4, or by a configuration in an updated DCI, an RRC message, or a MAC CE.

Illustrative Processes

Figure 10:
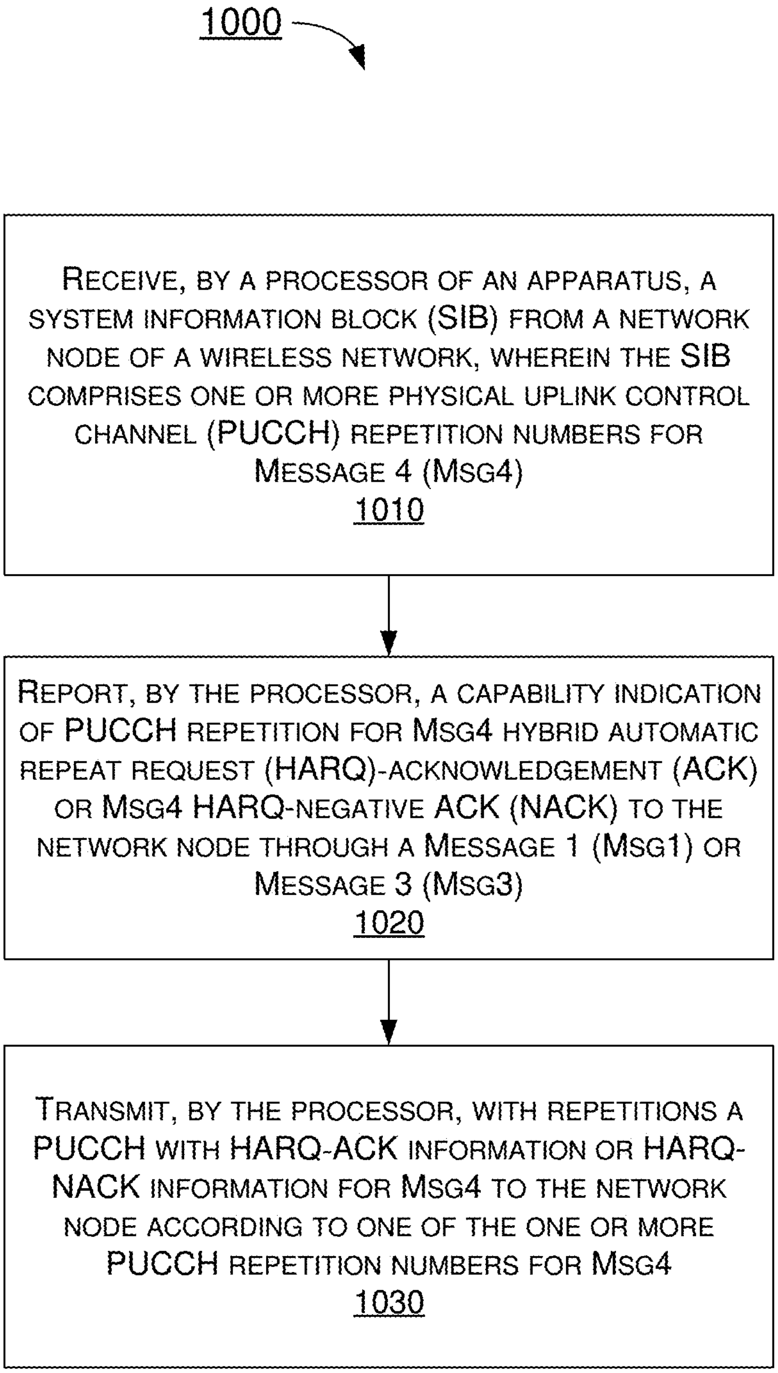
FIG. 10 is a flowchart of an example process in accordance with an implementation of the present disclosure.

FIG. 10 illustrates an example process 1000 in accordance with an implementation of the present disclosure. Process 1000 may be an example implementation of above scenarios/schemes, whether partially or completely, with respect to the capability indication of repetition for Msg4 HARQ-ACK or Msg4 HARQ-NACK with the present disclosure. Process 1000 may represent an aspect of implementation of features of communication apparatus 910. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by communication apparatus 910 or any suitable UE or machine type devices. Solely for illustrative purposes and without limitation, process 1000 is described below in the context of communication apparatus 910. Process 1000 may begin at block 1010.

At 1010, process 1000 may involve processor 912 of communication apparatus 910 receiving, via transceiver 916, an SIB from a network node of a wireless network, wherein the SIB may comprise one or more PUCCH repetition numbers for Msg4. Process 1000 may proceed from 1010 to 1020.

At 1020, process 1000 may involve processor 912 reporting, via transceiver 916, a capability indication of PUCCH repetition for Msg4 HARQ-ACK or Msg 4 HARQ-NACK to the network node through a Msg1 or a Msg3. Process 1000 may proceed from 1020 to 1030.

At 1030, process 1000 may involve processor 1012 transmitting, via transceiver 916, with repetitions a PUCCH with HARQ-ACK information or HARQ-NACK information for Msg4 to the network node according to one of the one or more PUCCH repetition numbers for Msg4.

In some implementations, process 1000 may involve processor 912 reporting, via transceiver 916, the capability indication of PUCCH repetition for Msg4 HARQ-ACK or Msg4 HARQ-NACK and another capability indication of PUSCH repetition for Msg3.

In some implementations, process 1000 may involve processor 912 determining the one PUCCH repetition number for Msg4 based on a DCI in an event that more than one PUCCH repetition numbers are configured in the SIB. In some implementations, process 1000 may involve processor 912 determining the one PUCCH repetition number for Msg4 based on the SIB in an event that only one PUCCH repetition number is configured in the SIB.

In some implementations, process 1000 may involve processor 912 receiving, via transceiver 916, a frequency hopping indication which is configured in the SIB or a DCI from the network node. The frequency hopping indication may indicate that an intra-slot frequency hopping or an inter-slot frequency hopping is used for each repetition of the PUCCH transmission with HARQ-ACK information or HARQ-NACK information for Msg4. In some implementations, process 1000 may involve processor 912 determining that the intra-slot frequency hopping is used for each repetition of the PUCCH transmission with HARQ-ACK information or HARQ-NACK information for Msg4 in an event that the frequency hopping indication is not configured in the SIB.

In some implementations, process 1000 may involve processor 912 receiving, via transceiver 916, an updated SIB in an RRC connected mode, wherein a single updated PUCCH repetition number for Msg4 is indicated in the updated SIB. Process 1000 may further involve processor 912 determining a current PUCCH repetition number for Msg4 based on the one PUCCH repetition number for Msg4 or the updated PUCCH repetition number for Msg4.

In some implementations, process 1000 may involve processor 912 receiving, via transceiver 916, an updated SIB in an RRC connected mode, wherein more than one updated PUCCH repetition numbers for Msg4 are indicated in the updated SIB. Process 1000 may further involve processor 912 determining a current PUCCH repetition number for Msg4 based on the one PUCCH repetition number for Msg4 or one of the updated PUCCH repetition numbers for Msg4, wherein the one updated PUCCH repetition number for Msg4 is indicated by a previous DCI associated with indicating the one PUCCH repetition number for Msg4, or by a configuration in an updated DCI, an RRC message, or a MAC CE.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of an apparatus, a system information block (SIB) from a network node of a wireless network, wherein the SIB comprises one or more physical uplink control channel (PUCCH) repetition numbers for Message 4 (Msg4);

reporting, by the processor, a capability indication of PUCCH repetition for Msg4 hybrid automatic repeat request (HARQ)-acknowledgement (ACK) or Msg4 HARQ-negative ACK (NACK) to the network node through a Message 1 (Msg1) or a Message 3 (Msg3), wherein, in an event that the capability indication of PUCCH repetition for Msg4 HARQ-ACK or Msg4 HARQ-NACK is reported through the Msg3, at least one reserved bit of a medium access control (MAC) subheader of the Msg3 is used to indicate the capability indication of PUCCH repetition for Msg4 HARQ-ACK or Msg4 HARQ-NACK, and wherein a logical channel identifier (LCID) of the MAC subheader of the Msg3 is further used to indicate the capability indication of PUCCH repetition for Msg4 HARQ-ACK or Msg4 HARQ-NACK; and transmitting, by the processor, with repetitions a PUCCH with HARQ-ACK information or HARQ-NACK information for Msg4 to the network node according to one of the one or more PUCCH repetition numbers for Msg4.

2. The method of claim 1, wherein the reporting of the capability indication of PUCCH repetition for Msg4 HARQ-ACK or Msg4 HARQ-NACK is performed by reporting another capability indication of physical uplink shared channel (PUSCH) repetition for Msg3 through the Msg1.

3. The method of claim 1, wherein the reporting of the capability indication of PUCCH repetition for Msg4 HARQ-ACK or Msg4 HARQ-NACK to the network node through the Msg1 or the Msg3 comprises:

reporting, by the processor, the capability indication of PUCCH repetition for Msg4 HARQ-ACK or Msg4 HARQ-NACK and another capability indication of PUSCH repetition for Msg3.

4. The method of claim 1, wherein the one PUCCH repetition number for Msg4 is determined based on a configuration of a PUSCH repetition number for Msg3.

5. The method of claim 1, further comprising:

determining, by the processor, the one PUCCH repetition number for Msg4 based on a downlink control information (DCI) in an event that more than one PUCCH repetition numbers are configured in the SIB; or determining, by the processor, the one PUCCH repetition number for Msg4 based on the SIB in an event that only one PUCCH repetition number is configured in the SIB.

6. The method of claim 1, further comprising:

receiving, by the processor, a frequency hopping indication which is configured in the SIB or a DCI from the network node, wherein the frequency hopping indication indicates that an intra-slot frequency hopping or an inter-slot frequency hopping is used for each repetition of the PUCCH transmission with HARQ-ACK information or HARQ-NACK information for Msg4; or determining, by the processor, that the intra-slot frequency hopping is used for each repetition of the PUCCH transmission with HARQ-ACK information or HARQ-NACK information for Msg4 in an event that the frequency hopping indication is not configured in the SIB.

7. The method of claim 1, further comprising:

receiving, by the processor, an updated SIB in a radio resource control (RRC) connected mode, wherein a single updated PUCCH repetition number for Msg4 is indicated in the updated SIB; and determining, by the processor, a current PUCCH repetition number for Msg4 based on the one PUCCH repetition number for Msg4 or the updated PUCCH repetition number for Msg4.

8. The method of claim 1, further comprising:

receiving, by the processor, an updated SIB in an RRC connected mode, wherein more than one updated PUCCH repetition numbers for Msg4 are indicated in the updated SIB; and determining, by the processor, a current PUCCH repetition number for Msg4 based on the one PUCCH repetition number for Msg4 or one of the updated PUCCH repetition numbers for Msg4, wherein the one updated PUCCH repetition number for Msg4 is indicated by a previous DCI associated with indicating the one PUCCH repetition number for Msg4, or by a configuration in an updated DCI, an RRC message, or a MAC control element (CE).

9. An apparatus, comprising:

a transceiver which, during operation, wirelessly communicates with at least one network node of a wireless network; and a processor communicatively coupled to the transceiver such that, during operation, the processor performs operations comprising:

receiving, via the transceiver, a system information block (SIB) from the network node, wherein the SIB comprises one or more physical uplink control channel (PUCCH) repetition numbers for Message 4 (Msg4);

reporting, via the transceiver, a capability indication of PUCCH repetition for Msg4 hybrid automatic repeat request (HARQ)-acknowledgement (ACK) or Msg4 HARQ-negative ACK (NACK) to the network node through a Message 1 (Msg1) or a Message 3 (Msg3), wherein, in an event that the capability indication of PUCCH repetition for Msg4 HARQ-ACK or Msg4 HARQ-NACK is reported through the Msg3, at least one reserved bit of a medium access control (MAC) subheader of the Msg3 is used to indicate the capability indication of PUCCH repetition for Msg4 HARQ-ACK or Msg4 HARQ-NACK, and wherein a logical channel identifier (LCID) of the MAC subheader of the Msg3 is further used to indicate the capability indication of PUCCH repetition for Msg4 HARQ-ACK or Msg4 HARQ-NACK; and transmitting, via the transceiver, with repetitions a PUCCH with HARQ-ACK information or HARQ-NACK information for Msg4 to the network node according to one of the one or more PUCCH repetition numbers for Msg4.

10. The apparatus of claim 9, wherein, during operation, in reporting the capability indication of PUCCH repetition for Msg4 HARQ-ACK or Msg4 HARQ-NACK, the processor is configured to perform operations comprising:

reporting, via the transceiver, another capability indication of physical uplink shared channel (PUSCH) repetition for Msg3 through the Msg1.

11. The apparatus of claim 9, wherein, during operation, in reporting the capability indication of PUCCH repetition for Msg4 HARQ-ACK or Msg4 HARQ-NACK to the network node through the Msg1 or the Msg3, the processor is configured to perform operations comprising:

reporting, via the transceiver, the capability indication of PUCCH repetition for Msg4 HARQ-ACK or Msg4 HARQ-NACK and another capability indication of PUSCH repetition for Msg3.

12. The apparatus of claim 9, wherein the one PUCCH repetition number for Msg4 is determined based on a configuration of a PUSCH repetition number for Msg3.

13. The apparatus of claim 9, wherein, during operation, the processor is further configured to perform operations comprising:

determining the one PUCCH repetition number for Msg4 based on a downlink control information (DCI) in an event that more than one PUCCH repetition numbers are configured in the SIB; or determining the one PUCCH repetition number for Msg4 based on the SIB in an event that only one PUCCH repetition number is configured in the SIB.

14. The apparatus of claim 9, wherein, during operation, the processor is further configured to perform operations comprising:

receiving, via the transceiver, a frequency hopping indication which is configured in the SIB or a DCI from the network node, wherein the frequency hopping indication indicates that an intra-slot frequency hopping or an inter-slot frequency hopping is used for each repetition of the PUCCH transmission with HARQ-ACK information or HARQ-NACK information for Msg4; or determining that the intra-slot frequency hopping is used for each repetition of the PUCCH transmission with HARQ-ACK information or HARQ-NACK information for Msg4 in an event that the frequency hopping indication is not configured in the SIB.

15. The apparatus of claim 9, wherein, during operation, the processor is further configured to perform operations comprising:

receiving, via the transceiver, an updated SIB in a radio resource control (RRC) connected mode, wherein a single updated PUCCH repetition number for Msg4 is indicated in the updated SIB; and determining a current PUCCH repetition number for Msg4 based on the one PUCCH repetition number for Msg4 or the updated PUCCH repetition number for Msg4.

16. The apparatus of claim 9, wherein, during operation, the processor is further configured to perform operations comprising:

receiving, via the transceiver, an updated SIB in an RRC connected mode, wherein more than one updated PUCCH repetition numbers for Msg4 are indicated in the updated SIB; and determining a current PUCCH repetition number for Msg4 based on the one PUCCH repetition number for Msg4 or one of the updated PUCCH repetition numbers for Msg4, wherein the one updated PUCCH repetition number for Msg4 is indicated by a previous DCI associated with indicating the one PUCCH repetition number for Msg4, or by a configuration in an updated DCI, an RRC message, or a MAC control element (CE).

* * * * *